United States Patent [19]

Gallagher

[11] 4,323,026
[45] Apr. 6, 1982

[54] DRAG REDUCING STRUCTURE TO MINIMIZE VESSEL COLLISION DAMAGE

[76] Inventor: John J. Gallagher, 1000 Conn. Ave., NW., #1103, Washington, D.C. 20036

[21] Appl. No.: 87,738

[22] Filed: Oct. 24, 1979

[51] Int. Cl.³ .............................................. B63B 59/02
[52] U.S. Cl. ..................................... 114/219; 114/56
[58] Field of Search ................. 114/56, 219; 293/107, 293/108, 110

[56] References Cited

U.S. PATENT DOCUMENTS

| 1,195,857 | 8/1916 | Royston ............................ 114/219 |
| 3,276,414 | 10/1966 | Lee ..................................... 114/219 |
| 3,512,822 | 5/1970 | Rich et al. ........................... 293/107 |
| 3,540,400 | 11/1970 | Boston et al. ......................... 114/56 |
| 3,593,531 | 7/1971 | Saadeh ............................ 114/219 X |
| 3,902,748 | 9/1975 | Bank et al. ...................... 114/219 X |

FOREIGN PATENT DOCUMENTS

| 919028 | 1/1973 | Canada .................................. 114/56 |
| 2024647 | 12/1971 | Fed. Rep. of Germany ........ 114/56 |

*Primary Examiner*—Charles A. Marmor

[57] ABSTRACT

The drag-reducing bulbous bow of a seagoing vessel is provided with energy-absorbing structure including a controllably released fluid to reduce damage imparted by that vessel upon collision with another vessel or with an object.

10 Claims, 4 Drawing Figures

DRAG REDUCING STRUCTURE TO MINIMIZE VESSEL COLLISION DAMAGE

BACKGROUND OF THE INVENTION

In present practice, it is common to form the bow of large vessels with a spheroidal structure projecting from the lower stem forming what is commonly known as a "bulbous bow". This structure, faired into the shell plating of the hull, serves to reduce the hydrodynamic drag form of the hull and thereby reduce the energy required to propel the vessel through the water. The structure is built with sufficient strength and rigidity to withstand the normal forces of use with the customary factor of safety. These normal forces include the hydrodynamic forces of the sea as well as the impacts and pressures which might be expected in low energy collisions and contacts during docking and warping maneuvers for example.

In collisions between vessels, it has been found that a bulbous bow structure of a colliding vessel can result in increased damage to the vessel collided with. This is caused by the location of the bulbous bow, forward of the bow and below or at the waterline, and the form of the bulbous portion. The spheroidal form presents essentially a point concentration of force making the structure an excellent penetrating tool, and an extremely efficient structural shape which readily overcomes the structural resistance of the relatively flat portions of the hull of the vessel collided with penetrating deep into the hull structure of that vessel with often, no major structural damage to the bulbous portion of the bow of the colliding vessel. Two cases in point where this occurred are the collision between the Sea Witch and the Esso Brussels in New York Harbor in June of 1973 and the collision between the NOTRE DAME VICTORY and the ATHOS at Paulsboro, New Jersey in February 1974.

SUMMARY OF THE INVENTION

It is an object of this invention to provide a bulbous bow for a vessel which will collapse upon the impact of collision to minimize damage to the object collided with;

It is another object of this invention to furnish a bulbous bow for a vessel which will absorb some of the energy of impact upon collision to minimize damage caused thereby.

It is an object of this invention to provide a bulbous bow for vessels which will collapse upon collision impact yet is supported to withstand the normal forces of operation. This is accomplished by forming a bulbous bow structure having sufficient strength to maintain its configuration under internal pressure yet be collapsible under external loading in the absence of supporting internal pressure, filling the bulbous structure with fluid under pressure for support thereof under normal operating loads and providing relief means to release the fluid from the bulbous structure under loads in excess of normal.

It should be understood that the term "fluid" as used herein is intended to include liquids, gasses, thixatropic substances and particulate solids which act in the manner of fluids under proper conditions or various multiphase combinations of these substances as required for the purposes of the invention.

In a preferred embodiment, this invention comprises external walls defining a spheroidal member projecting from the stem of a ship, the walls being constructed to sacrificially collapse upon impact with other structures; and internal wall forming a sealed chamber with the external walls, a fluid filling the chamber to support the external walls and maintain their configuration in minor collisions and the normal forces of the sea and valves communicating with the chamber to release fluid therefrom and provide for controlled collapse of the member and absorption of a portion of the energy of major impact.

These and the other objects and attendent advantages of the invention will become better understood by those skilled in the art by reference to the following detailed description when viewed in light of the accompanying drawings.

DESCRIPTION OF PREFERRED EMBODIMENTS

Figure 1:
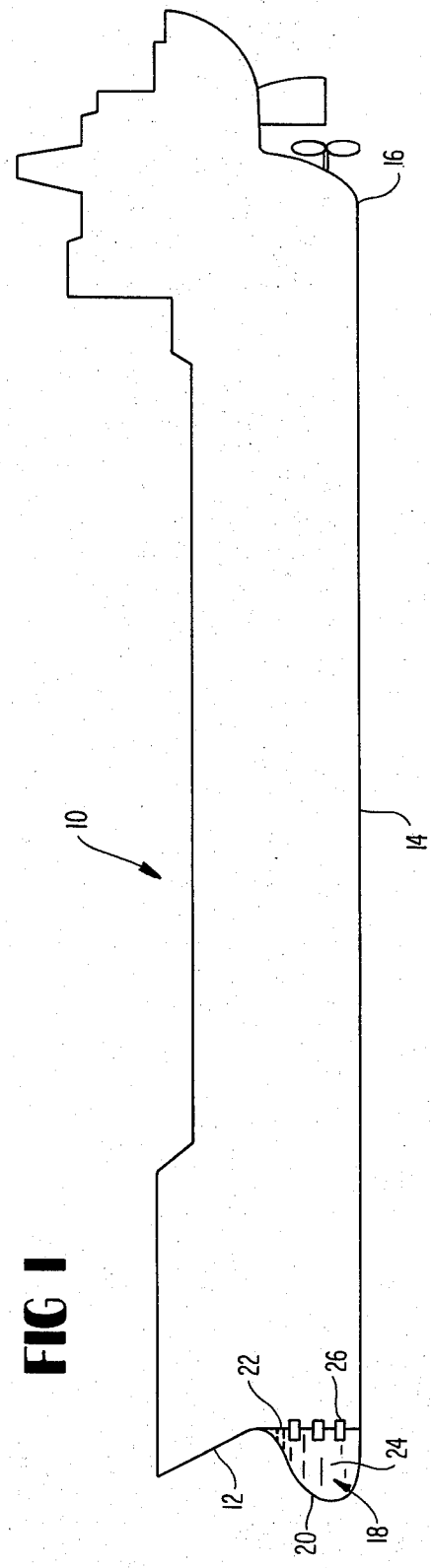
FIG. 1 is a schematic view of a ship embodying a bulbous bow constructed in accordance with the invention.

In FIG. 1, a ship, shown generally at 10, is illustrated in a schematic view. The ship conventionally comprises a stem 12, a cargo carrying midbody 14 and a stern section 16 containing the machine space, deck housing and propulsion and steering gear.

A bulbous bow, shown generally at 18 is constructed on the forward end of the ship 10 to project forward from the lower portion of the stem 12 as illustrated. This bow 18, generally varying in form from a semi-circular or elliptical body of revolution to an elongated cylinder terminating at the forward end in a semi-circular or elliptical body of revolution (hereinafter referred to generally as "spheroidal"), serves to reduce the hydrodynamic drag of vessels to minimize the energy required to propel them through the water. The structure currently fabricated with steel shell plating faired into the hull shell plating and supported by transverse framing and longitudinals in a manner conventional in the art. This structure is designed with the customary factor of safety to withstand the normal forces of use including hydrodynamic pressures of the sea and the incidental pressures of maneuvering contact with tugs and fixed structures encountered in normal docking and undocking. In this invention the bow 18 comprises a wall 20 which forms the spheroidal surface of the bulbous bow. An internal wall 22 closes the open end of the spheroidal form described by the wall 20 to form a fluidtight enclosure 24. A plurality of valves 26 are disposed through the wall 22 to provide controlled communication between the enclosure 24 and the interior of the ship 10. Support for the wall 20 is provided by a liquid, filling the enclosure 24 to transmit loads imposed on the wall 20 to the wall 22 and structure of the hull of the ship 10. The valves 26 are designed to release the liquid in the enclosure when the pressure of the liquid reaches a predetermined level.

Since liquid is substantially incompressible any load tending to deform the bulbous bow 18 and reduce the volume of the enclosure 24 will immediately be picked up by the liquid in the enclosure and transmitted in the form of increased pressure in the liquid equally to all structures forming the enclosure. In the cylindrical and/or spherical portions of the bow 18 this increased pressure will be resisted primarily in tension while the internal wall 22, if a flat plate, will be inbending. If desired, the wall 22 can be formed as segment of a sphere to more efficiently take up a portion of the load in tension as is well known in pressure design theory.

The wall 20 is preferably composed of a material compatible with the surrounding environment which has sufficient ductility to collapse in a cylindrical compressive buckling mode without rupturing, which has sufficient tensile strength to withstand tensile loading imposed thereon by compression of the bow 18 at levels below that generating fluid pressures in the enclosure 24 high enough to actuate the valves 26 and which is capable of maintaining the form of the bulbous bow under normal load conditions when supported by internal fluid pressure and preferably under light loading when unsupported by internal pressure.

The actual structure making up the wall 20 is preferably a matter of design choice which is best determined by optimizing through conventional engineering analysis and experimentation. The objectives which must be achieved by the structure are maintenance of form and durability under normal use conditions and the desired collapse features, as outlined above, under loadings in excess of the design loadings with the customary factor of safety. Such structure could comprise for example, a structural material such as metal plating, unsupported or supported by light framing, an elastomeric material such as rubber supported in the required expanded form by a filamentary or fabric base or core or a combination of a structural material or framing backed up by or supporting an elastomeric material.

The valves 26 may range from simple weak points or blow-out plugs formed in the structure of the internal wall 22 to adjustable pressure relief valves which can be set to release fluid from the enclosure 24 at a predetermined fluid pressure level. The optimum level for operation of the valves or failure of the structure or plugs, again, can be best determined by conventional calculation and experiment by those skilled in the art. The objective would be to determine a valve setting which would be as high above pressure generated by normal use loading as is possible without exceeding pressures which would support the wall 20 under loadings sufficient to cause major damage to the hull of a vessel collided with.

A feature of this invention is the utilization of the transfer of fluid from the enclosure as the bow 18 collapses to absorb some of the energy of collision. To this end, the valves 26 are sized, numbered and spaced to provide a maximum delay of collapse without causing a bursting overstress of the wall 20 or imposing severe damage on the hull of the vessel collided with under the design impact parameters.

The report on the collision of the SEA WITCH with the ESSO BRUSSELS calls for protection under impacts up to 6 knots. Using conventional analytical techniques, this parameter, combined with orifice sizing and nozzle configuration, can be used to establish the type, number, and placing of the valves 26 required to achieve the optimum results.

Obviously, in most cases, all of the impact energy cannot be absorbed by a collapsing bulbous bow structure, however, the bulbous bow can be removed from the collision picture as a penetrating structure and the absorption of a portion of the energy by its collapse must serve to reduce the ultimate damage caused by the collision. This device also can be combined with remaining bow structure designed for energy absorbing collapse to further reduce damaging penetration in this type of collision. Since the bulbous bow always will penetrate at or below the water line, removal of this structure as a penetrating device will necessarily reduce the danger of pollution or sinking caused by penetration of petroleum cargo and bunker tanks or major flooding of the vessel collided with.

Figure 2:
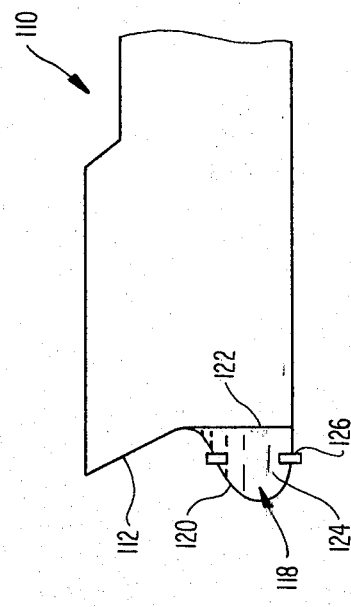
FIG. 2 is a schematic view of a portion of a ship showing another embodiment in accordance with the invention.

FIG. 2 is a schematic view of the bow portion of a ship illustrating another embodiment of the invention. In this embodiment, components corresponding to like components of FIG. 1 are indicated by like numerals only of the next higher order.

In this embodiment, the valves 126 are disposed in the wall 120 forming the bulbous bow 118 communicating the enclosure 124 and the liquid therein directly to the surrounding waters. Again, the valves 126 can comprise failure points designed into the wall 120, blow out plugs or sophisticated pressure relief valves as is found most suitable. The purpose, function, and operation of the components of FIG. 2 are substantially identical to those of the components of FIG. 1 with the exception of the orientation of the valves 126 and the direction of communication of the enclosure 124.

In some instances or in some ship designs it may be necessary to consider the effect of the weight of a liquid in the bulbous bow in the trim of the ship in some load or ballast configurations thereof. In these cases it may be necessary to manipulate the weight in the bow by furnishing a multiple phase fluid in the bow to alter the resultant density and/or buoyancy thereof. One method of decreasing the effective density of the fluid is to fill the bow enclosure with a liquid containing a suspension of hollow particulates (preferably spherical). Other methods are illustrated in FIGS. 3 and 4 where components thereof, corresponding to like components of the preceeding embodiments are indicated by like numerals of the next higher order.

Figure 3:
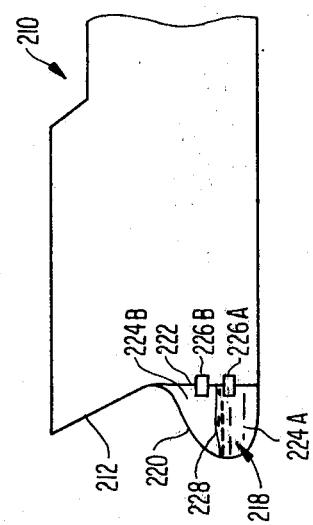
FIG. 3 is a view similar to FIG. 2 showing another embodiment in accordance with the invention.

In FIG. 3, the enclosure within the bulbous bow 218 is subdivided into sub enclosures 224A and 224B by a horizontal dividing wall 228. The wall 228 can be rigid or flexible, as shown, to provide for differing relative volumes between the sub enclosures 224A and 224B to alter the resulting weight in the bulbous bow 218 as trim requirements for the ship 210 dictate. Ballast, in this instance can be added or removed to the sub-enclosure 224A, which can double as a pressure relief valve, or through separate valving as may be desired. The required pressure in the bow 218 can be imposed by pressurizing the gas space in sub-enclosure 224B through the valve 226B which also can double as a pressure relief valve, or through separate valving as may be desired. Since the gas in the sub-enclosure 224B is compressible, the wall 220 must, to some degree, be resilient since it must deform under some loadings and be capable of regaining its design configuration.

Figure 4:
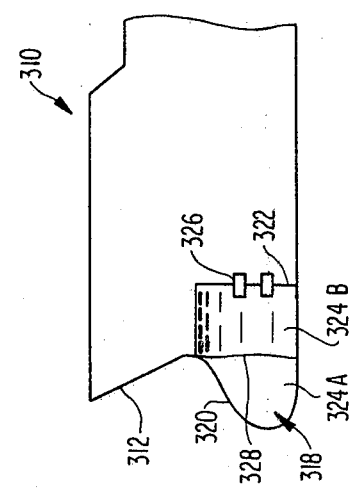
FIG. 4 is a view similar to FIG. 2 showing yet another embodiment in accordance with the invention.

In FIG. 4, a liquid/gas phase fluid is achieved by separating the sub-enclosures 324A and 324B with a vertical dividing wall or diaphragm 328. Liquid such as water fills the sub-enclosure 324B while a gas, such as air fills the sub-enclosure 324A providing a hydropneumatic system which can be prepressurized to a required operating pressure by conduits and valving (not shown) communicative with the sub-enclosure 324A. Pressure relief valves 326, in the internal wall 322, serve to release liquid from the enclosure 324B upon overpressures in an identical manner to the operation of the embodiment of the preceding embodiments. As in the embodiment of FIG. 3, the wall 320 should be sufficiently resilient to recover from deformation due to incidental pressures made possible by the compression of the gas phase of the system. The diaphragm 328 could be backed up by previous structure such as a perforate plate (not shown) on the gas side to resist deformation under the hydrostatic load of the liquid in sub-enclosure 324B.

As can be readily understood, the system within the bulbous bow can be made up of plural sub-enclosures or cells containing fluids of similar or differing phases, as is desired, and valved or constructed to release fluid therefrom into one another or externally of the bow structure simultaneously or in stages as the requirements for energy absorption of the ballast distribution for vessel trim dictate. The system can be sealed to furnish a constant load-pressure condition therein or can be valved and/or manifolded to provide for alteration of the load-pressure condition as required. Pressure relief and a fluid makeup system (not shown) can be provided to accommodate volume changes caused by thermal variations if required.

What has been set forth above is intended as exemplary of teachings in accordance with the invention to inable those skilled in the art to practice it.

What is new and desired to be protected by Letters Patent of the United States 13:

1. In a sea-going vessel having a drag reducing structure projecting from the forward end thereof generally below the water line, a means to reduce the damage caused by a bow collision of said vessel with other vessels by reducing the capability of said structure to penetrate another vessel and simultaneously absorb at least a portion of the energy of collision comprising: collapsible walls forming said structure, a substantially flat structural wall intersecting said collapsible walls to define therewith a fluid-tight enclosure within said structure;

fluid filling said enclosure to support said structure under the normal forces of use; and valve means communicative with said enclosure to release fluid therefrom and allow sacrificial collapse of said structure to said substantially flat structural wall upon impact of a predetermined magnitude therewith to thereby remove penetrating projections therefrom.

2. A drag reducing structure in accordance with claim 1 wherein said structure is spheroidal.

3. A drag reducing structure in accordance with claim 1 wherein said structure is formed of an elastomeric material.

4. A drag reducing structure in accordance with claim 3 wherein said elastomeric material is supported by a filimentary core.

5. A drag reducing structure in accordance with claim 1 wherein said structure is formed of light metal plating supported by internal pressure from said fluid against deformation under normal operational loading.

6. A drag reducing structure in accordance with claim 5 wherein said structure further comprises an elastomeric material backing said plating and containing said fluid.

7. A drag reducing structure in accordance with claim 1 wherein said valve means comprise blow-out plugs communicative with said enclosure and the ambient.

8. A device in accordance with claim 1 wherein said fluid comprises a multiple phase fluid.

9. A device in accordance with claim 8 further comprising a wall dividing said enclosure into sub enclosures and wherein said multiple phase fluid comprises gas in one of said sub enclosures and liquid in the other of said sub enclosures.

10. A device in accordance with claim 9 wherein said wall dividing said enclosure is elastomeric.

* * * * *